United States Patent
Furukawa et al.

(10) Patent No.: US 12,264,962 B2
(45) Date of Patent: Apr. 1, 2025

(54) COVER FOR INFRARED SENSOR AND METHOD OF MANUFACTURING COVER FOR INFRARED SENSOR

(71) Applicant: TOYODA GOSEI CO., LTD., Kiyosu (JP)

(72) Inventors: Kinji Furukawa, Kiyosu (JP); Kazuyoshi Fujimoto, Kiyosu (JP); Yosuke Maruoka, Kiyosu (JP); Yasuhiro Miyajima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 329 days.

(21) Appl. No.: 17/908,397

(22) PCT Filed: Mar. 24, 2021

(86) PCT No.: PCT/JP2021/012403
§ 371 (c)(1),
(2) Date: Aug. 31, 2022

(87) PCT Pub. No.: WO2021/193769
PCT Pub. Date: Sep. 30, 2021

(65) Prior Publication Data
US 2023/0104850 A1    Apr. 6, 2023

(30) Foreign Application Priority Data

Mar. 27, 2020  (JP) .................. 2020-057717

(51) Int. Cl.
| | | |
|---|---|---|
| *G01J 1/02* | (2006.01) | |
| *B32B 27/00* | (2006.01) | |
| *G01J 1/04* | (2006.01) | |
| *G01J 5/04* | (2006.01) | |
| *G01J 5/08* | (2022.01) | |

(Continued)

(52) U.S. Cl.
CPC ............ *G01J 1/0271* (2013.01); *B32B 27/00* (2013.01); *G01J 1/0252* (2013.01);
(Continued)

(58) Field of Classification Search
CPC ....... B32B 27/00; G01J 1/0252; G01J 1/0271; G01J 1/0407; G01J 5/046; G01J 5/0875; G02B 5/22
See application file for complete search history.

(56) References Cited

U.S. PATENT DOCUMENTS

| | | | |
|---|---|---|---|
| 6,268,438 B1* | 7/2001 | Ellul | .............. C08L 23/12 |
| | | | 525/197 |
| 2016/0130437 A1* | 5/2016 | Morizur | ............. C08K 5/005 |
| | | | 524/120 |

FOREIGN PATENT DOCUMENTS

| | | | |
|---|---|---|---|
| JP | 2018-031888 A | 3/2018 | |
| JP | 2018-109743 A | 7/2018 | |

(Continued)

OTHER PUBLICATIONS

Scientific Polymer Products, Inc., "Refractive Index of Polymers by Index" https://scipoly.com/technical-library/refractive-index-of-polymers-by-index/, Retrieved on Sep. 24, 2024. (Year: 2024).*

(Continued)

*Primary Examiner* — Mark R Gaworecki
(74) *Attorney, Agent, or Firm* — Posz Law Group, PLC

(57) ABSTRACT

An infrared sensor cover includes a decorative layer, a transparent first base, and a transparent second base. The decorative layer includes a first surface and a second surface opposite the first surface. The first base is made of a resin molded body and disposed on the first surface of the decorative layer. The second base is made of a resin molded body and disposed on the second surface of the decorative layer. An absolute value of a difference between refractive indices of a first resin material of the first base and a second resin material of the second base is less than or equal to 0.05. An absolute value of a difference between heat deflection (Continued)

temperatures of the first resin material and the second resin material is greater than or equal to 15 degrees.

3 Claims, 3 Drawing Sheets

(51) Int. Cl.
  *G01J 5/0875* (2022.01)
  *G02B 5/22* (2006.01)
(52) U.S. Cl.
  CPC ............. *G01J 1/0407* (2013.01); *G01J 5/046* (2013.01); *G01J 5/0875* (2013.01); *G02B 5/22* (2013.01)

(56) References Cited

FOREIGN PATENT DOCUMENTS

JP        6354888 B2     7/2018
JP        2019-007776 A  1/2019

OTHER PUBLICATIONS

International Search Report of the International Searching Authority mailed Jun. 15, 2021 for the corresponding International application No. PCT/JP2021/012403 (and English translation).

* cited by examiner

COVER FOR INFRARED SENSOR AND METHOD OF MANUFACTURING COVER FOR INFRARED SENSOR

CROSS REFERENCE TO RELATED APPLICATION

This application is a U.S. national stage application of PCT/JP2021/012403 filed on Mar. 24, 2021, which is based on and claims the benefit of priority of the prior Japanese Patent Application No. 2020-057717 filed on Mar. 27, 2020, the entire contents of which are incorporated herein by reference.

TECHNICAL FIELD

The present disclosure relates to an infrared sensor cover and a method for manufacturing the infrared sensor cover.

BACKGROUND ART

Patent Literature 1 discloses a near-infrared sensor cover (hereinafter referred to as "cover"). The cover includes a colored translucent cover body. The cover body is made of a resin material of which the main component is a colored transparent resin material. Examples of the colored transparent resin material include polycarbonate (PC), polymethyl methacrylate (PMMA), and cyclo olefin polymer (COP). The colored resin material refers to a material in which resin is colored by mixing a colorant (e.g., pigment) into a resin material or by mixing a glittering material and a colorant into a resin material.

Such a cover may include a decorative layer made of a metal material, a transparent first base made of a resin molded body and disposed on the outer surface of the decorative layer, and a transparent second base made of a resin molded body and disposed on the inner surface of the decorative layer. To manufacture such a cover, first of all, the first base is injection-molded. Subsequently, the decorative layer is formed on the inner surface of the first base through vapor deposition or painting. Then, the second base is injection-molded on the inner surface of the decorative layer by inserting the first base on which the decorative layer is formed.

CITATION LIST

Patent Literature

Patent Literature 1: Japanese Laid-Open Patent Publication No. 2018-31888

SUMMARY OF INVENTION

Technical Problem

In such a cover and the method for manufacturing the cover, during molding of the second base, the decorative layer may be creased or broken. This occurs when the first base is deformed by the heat of molten resin included in the second base.

To solve this problem, for example, it may be possible to select, as the resin material of the first base, a resin material that is more heat-resistant than the resin material of the second base. However, in this case, since the resin material of the first base is different from that of the second base, the infrared rays emitted from the infrared sensor tend to be reflected on the interface between the first base and the second base. As a result, the detection position of a target subject to detection is greatly displaced. This worsens the accuracy of detection by the infrared sensor.

It is an objective of the present disclosure to provide an infrared sensor cover that reduces thermal damage on a decorative layer while limiting the worsening of the accuracy of detection by an infrared sensor, and a method for manufacturing the infrared sensor cover.

Solution to Problem

An infrared sensor cover that achieves above-described objective allows for passage of infrared rays emitted from an infrared sensor. The infrared sensor cover includes a decorative layer including a first surface and a second surface opposite the first surface, a transparent first base made of a resin molded body and disposed on the first surface of the decorative layer, and a transparent second base made of a resin molded body and disposed on the second surface of the decorative layer. An absolute value of a difference between a refractive index of a first resin material of the first base and a refractive index of a second resin material of the second base is less than or equal to 0.05. An absolute value of a difference between a heat deflection temperature of the first resin material and a heat deflection temperature of the second resin material is greater than or equal to 15 degrees. The larger the absolute value of the difference between the refractive index of the first resin material of the first base and the refractive index of the second resin material of the second base, the larger the angle formed when an infrared ray refracts on the interface between the first base and the second base (hereinafter referred to as "refraction angle $\alpha$"). The larger the angle formed by the interface and the direction in which the infrared ray emitted from the infrared sensor enters, the larger the refraction angle $\alpha$.

In the above-described structure, the absolute value of the difference between the refractive index of the first resin material and the refractive index of the second resin material is less than or equal to 0.05. Thus, when the angle of incidence of an infrared ray is 5 degrees, the displacement of a detection target that is 100 m ahead is less than or equal to 1 m.

The temperature at which a resin material is molded (hereinafter referred to as "molding temperature") is substantially proportional to the heat deflection temperature of that resin material. In the above-described structure, the absolute value of the difference between the heat deflection temperature of the first resin material and the heat deflection temperature of the second resin material is greater than or equal to 15 degrees. Thus, by first molding one of the first and second bases that has a relatively high heat deflection temperature, then forming the decorative layer on that base, and then molding, from the opposite side of that base, the other one of the first and second bases that has a relatively low heat deflection temperature on the decorative layer, the base having a relatively low heat deflection temperature is molded at a reduced temperature. This reduces the thermal damage on the decorative layer during molding of the base having a relatively low heat deflection temperature.

Accordingly, the above-described structure reduces the thermal damage on the decorative layer while limiting the worsening of the detection accuracy by the infrared sensor.

In the infrared sensor cover, it is preferred that the first surface of the decorative layer be an outer surface of the decorative layer, the second surface of the decorative layer be an inner surface of the decorative layer, and the heat deflection temperature of the first resin material be higher than the heat deflection temperature of the second resin material.

In the infrared sensor cover, attachment portions or the like are normally disposed on one of the bases that is disposed on the inner surface of the decorative layer. Thus, the base on the inner surface of the decorative layer has a complicated structure. Accordingly, if the base on the inner surface of the decorative layer is first molded, a step that removes that base from a mold, a step that forms the decorative layer on that base and a step that molds, from the opposite side of that base, the other base on the decorative layer become complicated.

In the above-described structure, the first base on the outer surface of the decorative layer is molded using the first resin material with the heat deflection temperature that is higher than that of the second resin material on the inner surface of the decorative layer. Thus, the first base is first molded, with a relatively simple structure where the attachment portions or the like are not disposed. This limits the above-described inconvenience.

In the infrared sensor cover, it is preferred that the first resin material be polycarbonate of bisphenol A having a single structure or a copolymerized polycarbonate of bisphenol A and imide monomer, and it is preferred that the second resin material be a copolymerized polycarbonate of bisphenol A and aliphatic monomer or a copolymerized polycarbonate of bisphenol A and ester monomer.

In such a structure, the first resin material and the second resin material are both polycarbonate. Thus, the refractive index of the first resin material readily becomes closer to the refractive index of the second resin material.

On the one hand, in the copolymerized polycarbonate of bisphenol A and imide monomer, the imide monomer having a high melting point is contained. Thus, the heat deflection temperature is readily increased as compared with polycarbonate of bisphenol A having a single structure.

On the other, in the copolymerized polycarbonate of bisphenol A and aliphatic monomer or the copolymerized polycarbonate of bisphenol A and ester monomer, the aliphatic monomer or ester monomer having a low melting point is contained. Thus, the heat deflection temperature is readily decreased as compared with polycarbonate of bisphenol A having a single structure.

In particular, polycarbonate of bisphenol A having a single structure can be used as the first resin material by greatly reducing the heat deflection temperature of the second resin material.

A method for manufacturing an infrared sensor cover that achieves the above-described objective includes molding the first base using the first resin material having a higher heat deflection temperature than the second resin material, forming the decorative layer on an inner surface of the first base, and molding the second base on the inner surface of the decorative layer by inserting the first base on which the decorative layer is formed.

In this method, the first base on the outer surface of the decorative layer is molded using the resin material with a heat deflection temperature that is higher than that of the resin material of the second base on the inner surface of the decorative layer. Next, the decorative layer is formed on the inner surface of the first base. Then, the second base is molded on the inner surface of the decorative layer by inserting the first base on which the decorative layer is formed. Thus, the first base is first molded, with a relatively simple structure where the attachment portions or the like are not disposed. This makes, for example, the step that removes the first base from a mold less complicated.

Advantageous Effects of Invention

The present disclosure reduces the thermal damage on the decorative layer while limiting the worsening of the detection accuracy by the infrared sensor.

DESCRIPTION OF EMBODIMENTS

An infrared sensor cover and a method for manufacturing the infrared sensor cover according to an embodiment will now be described with reference to FIGS. 1 to 3.

Figure 1:
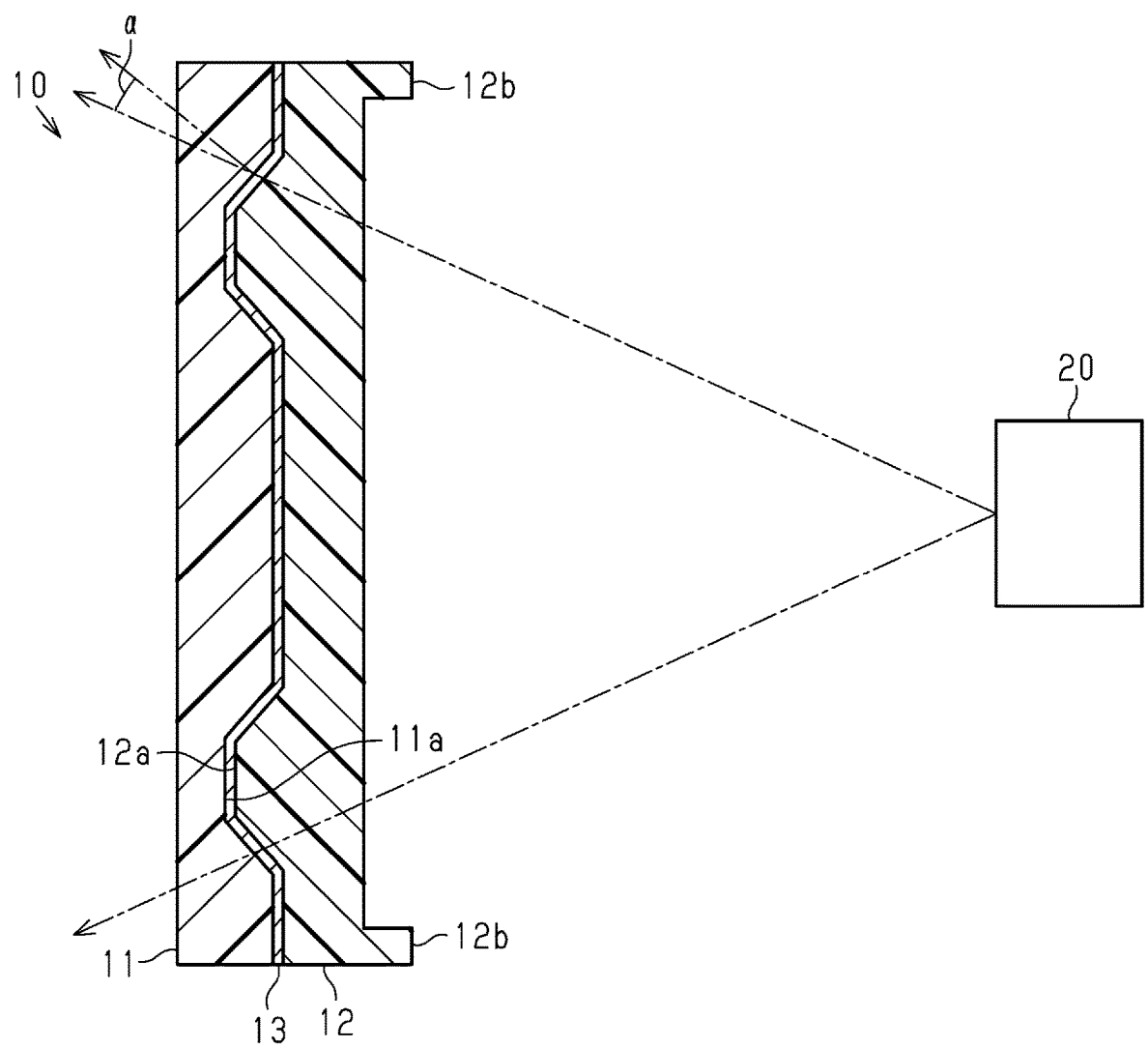
FIG. 1 is a diagram of an infrared sensor cover according to an embodiment, illustrating an infrared sensor and a cover.

Referring to FIG. 1, a vehicle is equipped with an infrared sensor 20 and an infrared sensor cover (hereinafter referred to as the "cover 10"). The cover 10 is located on the front side in a transmission direction of near-infrared rays (hereinafter referred to simply as "infrared rays") transmitted from the infrared sensor 20. The cover 10 allows for the passage of infrared rays.

Regarding the cover 10, the front side and the rear side in the transmission direction of infrared rays transmitted from the infrared sensor 20 are hereinafter referred to as the "outer side" and the "inner side."

The cover 10 includes a transparent plate-shaped first base 11 made of a resin molded body, a decorative layer 13 made of a metal material and disposed on the inner surface of the first base 11, and a transparent plate-shaped second base 12 made of a resin molded body and disposed on the inner surface of the decorative layer 13. That is, the first base 11 is disposed on a first surface (the outer surface in the present embodiment) of the decorative layer 13, and the second base 12 is disposed on a second surface (the inner surface in the present embodiment) of the decorative layer 13 opposite the first surface.

The inner surface of the first base 11 includes recesses 11a. The outer surface of the first base 11 may include a hard coating layer (not shown).

The decorative layer 13 is formed on the inner surface of the first base 11, which includes the recesses 11a.

The outer surface of the second base 12 includes projections 12a that are fitted into the recesses 11a of the first base 11, respectively.

Attachment portions 12b protrude from the inner surface of the second base 12. The inner surface of the second base 12 may include a heater layer. When energized, the heater layer generates heat so as to heat the cover 10. As a result, the heat melts snow that adheres to the outer surface of the cover 10.

The resin material of the first base 11 is referred to as the "first resin material." The resin material of the second base 12 is referred to as the "second resin material." The absolute value $|n1-n2|$ of the difference between a refractive index $n1$ of the first resin material in the wavelength of an infrared ray and a refractive index $n2$ of the second resin material in the wavelength of an infrared ray is less than or equal to 0.05.

A heat deflection temperature T1 of the first resin material is higher than a heat deflection temperature T2 of the second resin material. The difference ΔT (ΔT=T1−T2) is greater than or equal to 15 degrees.

The first resin material is polycarbonate of bisphenol A having a single structure or a copolymerized polycarbonate of bisphenol A and imide monomer.

The second resin material is a copolymerized polycarbonate of bisphenol A and aliphatic monomer or a copolymerized polycarbonate of bisphenol A and ester monomer.

The method for manufacturing the cover 10 will now be described with reference to FIGS. 2A to 2D.

Figure 2A:
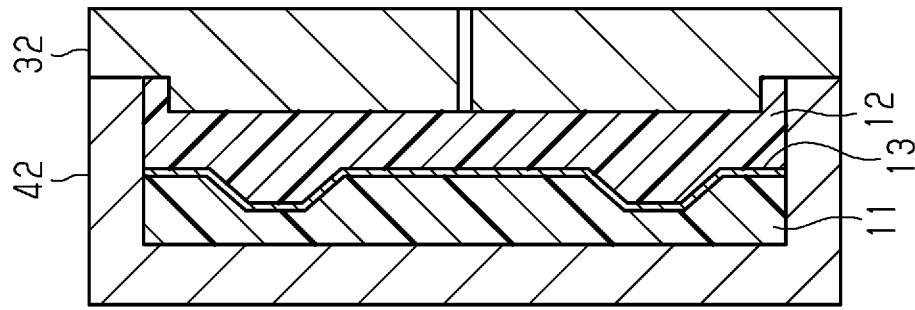
FIGS. 2A to 2D are cross-sectional views sequentially showing the steps of manufacturing the cover according to the embodiment.
Figure 3:
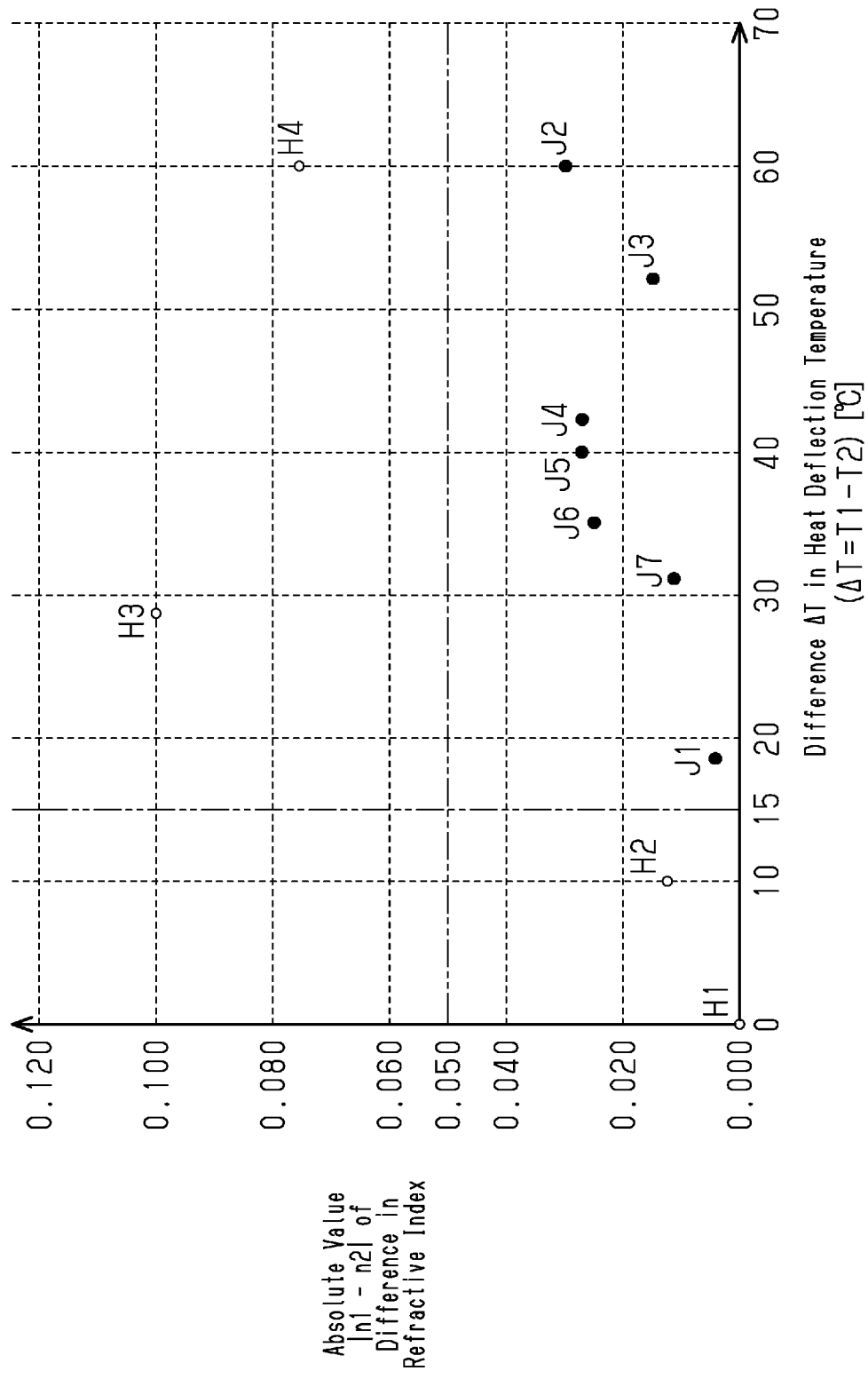
FIG. 3 is a graph illustrating the relationship between the difference between the heat deflection temperatures of the first and second bases and the absolute value of the difference between the refractive indices of the first and second bases according to examples and comparative examples.

First, as shown in FIG. 2A, a first base molding step is performed to manufacture the cover 10. In this step, the first base 11 is molded by injecting the first resin material in a molten state into the cavity formed by a first fixed die 31 and a first movable die 41.

Figures 2B, 2C, 2D:
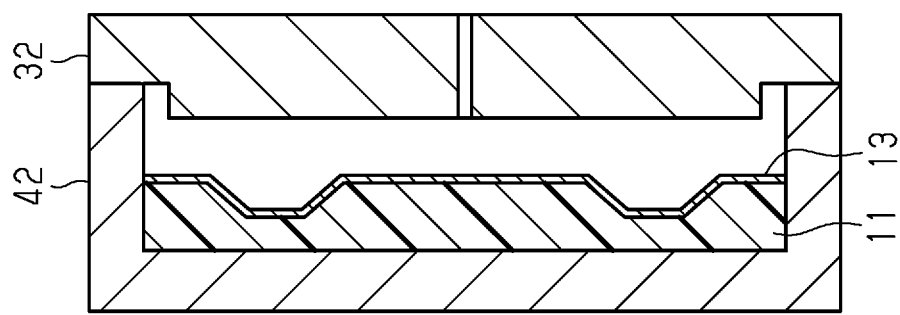

Next, as shown in FIG. 2B, a decorative layer forming step is performed to remove the first base 11 from the first fixed die 31 and the first movable die 41 and form the decorative layer 13 on the inner surface of the first base 11. The decorative layer 13 may be formed through vapor deposition or painting.

Subsequently, as shown in FIG. 2C, the first base 11 on which the decorative layer 13 is formed is inserted into a second movable die 42.

Then, as shown in FIG. 2D, a second base molding step is performed. In this step, the second base 12 is molded by injecting the second resin material in a molten state into the cavity formed by a second fixed die 32 and the second movable die 42.

Examples and comparative examples will now be described with reference to FIG. 3 and Tables 1 to 3.

First Example

The first resin material is polycarbonate of bisphenol A having a single structure. More specifically, the first resin material is 123R (product name) produced by SABIC.

The second resin material is a copolymerized polycarbonate (copolymerized PC) of bisphenol A and aliphatic monomer. More specifically, the second resin material is HFD1930 (product name) produced by SABIC.

When the wavelength is 905 nm, the absolute value |n1−n2| of the difference in refractive index is 0.004, and the difference ΔT in heat deflection temperature is 18° C. No thermal damage occurred in the decorative layer 13.

Second Example

The first resin material is a copolymerized polycarbonate of bisphenol A and imide monomer. More specifically, the first resin material is CXT19 (product name) produced by SABIC.

The second resin material is a copolymerized polycarbonate of bisphenol A and aliphatic monomer, and is the same as the second resin material of the first example.

When the wavelength is 905 nm, the absolute value |n1−n2| of the difference in refractive index is 0.031, and the difference ΔT in heat deflection temperature is 60° C. No thermal damage occurred in the decorative layer 13.

Third Example

The first resin material is a copolymerized polycarbonate of bisphenol A and imide monomer, and is the same as the first resin material of the second example.

The second resin material is a copolymerized polycarbonate of bisphenol A and ester monomer. More specifically, the second resin material is SLX1432 (product name) produced by SABIC.

When the wavelength is 905 nm, the absolute value |n1−n2| of the difference in refractive index is 0.015, and the difference ΔT in heat deflection temperature is 52° C. No thermal damage occurred in the decorative layer 13.

Fourth Example

The first resin material is a copolymerized polycarbonate of bisphenol A and imide monomer, and is the same as the first resin material of the second and third examples.

The second resin material is polycarbonate of bisphenol A having a single structure, and is the same as the first resin material of the first example.

When the wavelength is 905 nm, the absolute value |n1−n2| of the difference in refractive index is 0.027, and the difference ΔT in heat deflection temperature is 42° C. No thermal damage occurred in the decorative layer 13.

TABLE 1

|  |  | First Example | Second Example | Third Example | Fourth Example |
|---|---|---|---|---|---|
| First Base | First Resin Material | PC | Copolymerized PC | Copolymerized PC | Copolymerized PC |
|  | Product Name | 123R | CXT19 | CXT19 | CXT19 |
|  | Refractive Index n1 | 1.585 | 1.612 | 1.612 | 1.612 |
|  | Heat Deflection Temperature T1 [° C.] | 128 | 170 | 170 | 170 |
|  | Main Component | Bisphenol A | Bisphenol A | Bisphenol A | Bisphenol A |
|  | Sub-Component | None | Imide Monomer | Imide Monomer | Imide Monomer |
| Second Base | Second Resin Material | Copolymerized PC | Copolymerized PC | Copolymerized PC | PC |
|  | Product Name | HFD1930 | HFD1930 | SLX1432 | 123R |
|  | Refractive Index n2 | 1.581 | 1.581 | 1.597 | 1.585 |
|  | Heat Deflection Temperature T2 [° C.] | 110 | 110 | 118 | 128 |
|  | Main Component | Bisphenol A | Bisphenol A | Bisphenol A | Bisphenol A |
|  | Sub-Component | Aliphatic Monomer | Aliphatic Monomer | Ester Monomer | None |
| Absolute Value |n1 − n2| of Difference in Refractive Index |  | 0.004 | 0.031 | 0.015 | 0.027 |
| Difference ΔT in Heat Deflection Temperature (ΔT = T1 − T2) [° C.] |  | 18 | 60 | 52 | 42 |
| Thermal Damage on Decorative Layer |  | Not Confirmed | Not Confirmed | Not Confirmed | Not Confirmed |

TABLE 2

|  |  | Fifth Example | Sixth Example | Seventh Example |
|---|---|---|---|---|
| First Base | First Resin Material | Copolymerized PC | Copolymerized PC | Copolymerized PC |
|  | Product Name | CXT17 | CXT17 | CXT17 |
|  | Refractive Index n1 | 1.608 | 1.608 | 1.608 |
|  | Heat Deflection Temperature T1 [° C.] | 150 | 150 | 150 |
|  | Main Component | Bisphenol A | Bisphenol A | Bisphenol A |
|  | Sub-Component | Imide Monomer | Imide Monomer | Imide Monomer |
| Second Base | Second Resin Material | Copolymerized PC | Copolymerized PC | Copolymerized PC |
|  | Product Name | HFD1930 | HFD1830 | SLX1432 |
|  | Refractive Index n2 | 1.581 | 1.583 | 1.597 |
|  | Heat Deflection Temperature T2 [° C.] | 110 | 115 | 118 |
|  | Main Component | Bisphenol A | Bisphenol A | Bisphenol A |
|  | Sub-Component | Aliphatic Monomer | Aliphatic Monomer | Ester Monomer |
| Absolute Value |n1 − n2| of Difference in Refractive Index |  | 0.027 | 0.025 | 0.011 |
| Difference ΔT in Heat Deflection Temperature (ΔT = T1 − T2) [° C.] |  | 40 | 35 | 32 |
| Thermal Damage on Decorative Layer |  | Not Confirmed | Not Confirmed | Not Confirmed |

Fifth Example

The first resin material is a copolymerized polycarbonate of bisphenol A and imide monomer. More specifically, the first resin material is CXT17 (product name) produced by SABIC.

The second resin material is a copolymerized polycarbonate of bisphenol A and aliphatic monomer, and is the same as the second resin material of the first example.

When the wavelength is 905 nm, the absolute value |n1−n2| of the difference in refractive index is 0.027, and the difference ΔT in heat deflection temperature is 40° C. No thermal damage occurred in the decorative layer 13.

Sixth Example

The first resin material is a copolymerized polycarbonate of bisphenol A and imide monomer, and is the same as the first resin material of the fifth example.

The second resin material is a copolymerized polycarbonate (copolymerized PC) of bisphenol A and aliphatic monomer. More specifically, the second resin material is HFD1830 (product name) produced by SABIC.

When the wavelength is 905 nm, the absolute value |n1−n2| of the difference in refractive index is 0.025 and the difference ΔT in heat deflection temperature is 35° C. No thermal damage occurred in the decorative layer 13.

Seventh Example

The first resin material is a copolymerized polycarbonate of bisphenol A and imide monomer, and is the same as the first resin material of the fifth and sixth examples.

The second resin material is a copolymerized polycarbonate of bisphenol A and ester monomer, and is the same as the second resin material of the third example.

When the wavelength is 905 nm, the absolute value |n1−n2| of the difference in refractive index is 0.011 and the difference ΔT in heat deflection temperature is 32° C. No thermal damage occurred in the decorative layer 13.

TABLE 3

|  |  | First Comparative Example | Second Comparative Example | Third Comparative Example | Fourth Comparative Example |
|---|---|---|---|---|---|
| First Base | First Resin Material | PC | PC | PC | PC |
|  | Product Name | 123R | 123R | 123R | 123R |
|  | Refractive Index n1 | 1.585 | 1.585 | 1.585 | 1.585 |
|  | Heat Deflection Temperature T1 [° C.] | 128 | 128 | 128 | 128 |
|  | Main Component | Bisphenol A | Bisphenol A | Bisphenol A | Bisphenol A |
|  | Sub-Component | None | None | None | None |
| Second Base | Second Resin Material | PC | Copolymerized PC | PMMA | Transparent ABS |
|  | Product Name | 123R | SLX1432 | VH001 | Cevian ® V-T500 |
|  | Refractive Index n2 | 1.585 | 1.597 | 1.485 | 1.509 |
|  | Heat Deflection Temperature T2 [° C.] | 128 | 118 | 100 | 68 |
|  | Main Component | Bisphenol A | Bisphenol A | — | — |
|  | Sub-Component | None | Ester Monomer | — | — |
| Absolute Value |n1 − n2| of Difference in Refractive Index |  | 0 | 0.012 | 0.100 | 0.076 |
| Difference ΔT in Heat Deflection Temperature (ΔT = T1 − T2) [° C.] |  | 0 | 10 | 28 | 60 |
| Thermal Damage on Decorative Layer |  | Confirmed | Confirmed | Not Confirmed | Not Confirmed |

First Comparative Example

The first resin material is polycarbonate (PC) of bisphenol A having a single structure, and is the same as the first resin material of the first example.

The second resin material is polycarbonate (PC) of bisphenol A having a single structure, and is the same as the first resin material of the first example.

When the wavelength is 905 nm, the absolute value |n1−n2| of the difference in refractive index is 0 and the difference ΔT in heat deflection temperature is 0° C. Thermal damage occurred in the decorative layer 13.

Second Comparative Example

The first resin material is polycarbonate (PC) of bisphenol A having a single structure, and is the same as the first resin material of the first example and the first comparative example.

The second resin material is a copolymerized polycarbonate of bisphenol A and ester monomer, and is the same as the second resin material of the third and seventh examples.

When the wavelength is 905 nm, the absolute value |n1−n2| of the difference in refractive index is 0.012 and the difference ΔT in heat deflection temperature is 10° C.

Thermal damage occurred in the decorative layer 13.

Third Comparative Example

The first resin material is polycarbonate (PC) of bisphenol A having a single structure, and is the same as the first resin material of the first example and the first and second comparative examples.

The second resin material is polymethyl methacrylate (PMMA). More specifically, the second resin material is VH001 (product name) produced by Mitsubishi Chemical Corporation.

When the wavelength is 905 nm, the absolute value |n1−n2| of the difference in refractive index is 0.100 and the difference ΔT in heat deflection temperature is 28° C. No thermal damage occurred in the decorative layer 13.

Fourth Comparative Example

The first resin material is polycarbonate (PC) of bisphenol A having a single structure, and is the same as the first resin material of the first example and the first to third comparative examples.

The second resin material is a transparent ABS resin. More specifically, the second resin material is Cevian® V-T500 (product name) produced by Daicel Polymer Ltd.

When the wavelength is 905 nm, the absolute value |n1−n2| of the difference in refractive index is 0.076, and the difference ΔT in heat deflection temperature is 60° C. No thermal damage occurred in the decorative layer 13.

The operation of the present embodiment will now be described.

The larger the absolute value |n1−n2| of the difference between the refractive index n1 of the first resin material and the refractive index n2 of the second resin material, the larger the angle formed when an infrared ray refracts on the interface between the first base 11 and the second base 12 (hereinafter referred to as "refraction angle α") (refer to FIG. 1). The larger the angle formed by the interface and the direction in which the infrared ray emitted from the infrared sensor 20 enters, the larger the refraction angle α.

In the present embodiment, the difference between the refractive index n1 of the first resin material and the refractive index n2 of the second resin material is less than or equal to 0.05. Thus, when the angle of incidence of an infrared ray is 5 degrees, the displacement of a detection target which is 100 m ahead is less than or equal to 1 m.

The temperature at which a resin material is molded (hereinafter referred to as "molding temperature") is substantially proportional to the heat deflection temperature of that resin material. In the present embodiment, the difference ΔT (ΔT=T1−T2) between the heat deflection temperature T1 of the first resin material and the heat deflection temperature T2 of the second resin material is greater than or equal to 15 degrees. Thus, the second base 12 is molded at a reduced temperature by first molding one of the first base 11 and the second base 12 that has a relatively high heat deflection temperature, namely, the first base 11, then forming the decorative layer 13 on the first base 11, and then molding the second base 12 on the decorative layer 13 from the opposite side of the first base 11. This reduces the thermal damage on the decorative layer 13 during molding of the second base 12.

The infrared sensor cover and the method for manufacturing the infrared sensor cover according to the present embodiment has the following advantages.

(1) The absolute value |n1−n2| of the difference between the refractive index n1 of the first resin material and the refractive index n2 of the second resin material is less than or equal to 0.05. Further, the absolute value |T1−T2| of the difference between the heat deflection temperature T1 of the first resin material and the heat deflection temperature T2 of the second resin material is greater than or equal to 15 degrees.

This structure produces the above-described operation, and thus reduces thermal damage on the decorative layer 13 while limiting the worsening of the detection accuracy by the infrared sensor 20.

(2) The first base 11 is disposed on the outer surface of the decorative layer 13. The second base 12 is disposed on the inner surface of the decorative layer 13. The heat deflection temperature T1 of the first resin material is higher than the heat deflection temperature T2 of the second resin material (T1>T2).

In the infrared sensor cover 10, since the attachment portions 12b or the like for the vehicle are normally disposed on the second base 12, which is disposed on the inner surface of the decorative layer 13, the second base 12 has a complicated structure. Thus, if the second base 12 is first molded, a step that removes the second base 12 from a mold, a step that forms the decorative layer 13 on the second base 12, and a step that molds the first base 11 on the decorative layer 13 from the opposite side of the second base 12 become complicated.

In the above-described structure, the first base 11 on the outer surface of the decorative layer 13 is molded using the first resin material with the heat deflection temperature T1 that is higher than that of the second resin material on the inner surface of the decorative layer 13. Thus, the first base 11 is first molded, with a relatively simple structure where the attachment portions 12b or the like are not disposed. This limits the above-described inconvenience.

(3) The first resin material is polycarbonate of bisphenol A having a single structure or a copolymerized polycarbonate of bisphenol A and imide monomer. The second resin material is a copolymerized polycarbonate of bisphenol A and aliphatic monomer or a copolymerized polycarbonate of bisphenol A and ester monomer.

In such a structure, the first resin material and the second resin material are both polycarbonate. Thus, the refractive index n1 of the first resin material readily becomes closer to the refractive index n2 of the second resin material.

On the one hand, in the copolymerized polycarbonate of bisphenol A and imide monomer, the imide monomer having a high melting point is contained. Thus, the heat deflection temperature T1 is readily increased as compared with polycarbonate of bisphenol A having a single structure.

On the other, in the copolymerized polycarbonate of bisphenol A and aliphatic monomer or the copolymerized polycarbonate of bisphenol A and ester monomer, the aliphatic monomer or ester monomer having a low melting point is contained. Thus, the heat deflection temperature T2 is readily decreased as compared with polycarbonate of bisphenol A having a single structure.

In particular, polycarbonate of bisphenol A having a single structure can be used as the first resin material by greatly reducing the heat deflection temperature T2 of the second resin material.

(4) The method for manufacturing the cover 10 includes the first base molding step that molds the first base 11 using the first resin material with the heat deflection temperature T1 that is higher than that of the second resin material, the decorative layer forming step that forms the decorative layer 13 on the inner surface of the first base 11, and the second base molding step that molds the second base 12 on the inner surface of the decorative layer 13 by inserting the first base 11 on which the decorative layer 13 is formed.

In such a method, the first base 11 on the outer surface of the decorative layer 13 is molded using a resin material with the heat deflection temperature T1 that is higher than that of the resin material of the second base 12 on the inner surface of the decorative layer 13. Next, the decorative layer 13 is formed on the inner surface of the first base 11. Then, the second base 12 is molded on the inner surface of the decorative layer 13 by inserting the first base 11 on which the decorative layer 13 is formed. Thus, the first base 11 is first molded, with a relatively simple structure where the attachment portions 12b or the like are not disposed. Thus, for example, the step that removes the first base 11 from a mold is made less complicated.

Modifications

The present embodiment may be modified as follows. The present embodiment and the following modifications can be combined as long as they remain technically consistent with each other.

The attachment portions 12b may be, for example, separate from the second base 12. In this case, the first base 11 can be located on the inner surface of the decorative layer 13, and the second base 12 can be located on the outer surface of the decorative layer 13.

The first and second resin materials according to the present disclosure are not limited to those exemplified in the above-described embodiment. The first and second resin materials may each be any resin material as long as the absolute value |n1−n2| of the difference between the refractive index n1 of the first resin material and the refractive index n2 of the second resin material is less than or equal to 0.05 and the absolute value |T1−T2| of the difference between the heat deflection temperature T1 of the first resin material and the heat deflection temperature T2 of the second resin material is greater than or equal to 15 degrees.

REFERENCE SIGNS LIST

10) Cover
11) First Base
11a) Recess
12) Second Base
12a) Projection
12b) Attachment Portion
13) Decorative Layer
20) Infrared Sensor
31) First Fixed Die
32) Second Fixed Die
41) First Movable Die
42) Second Movable Die

The invention claimed is:

1. An infrared sensor cover that allows for passage of infrared rays emitted from an infrared sensor, the infrared sensor cover comprising:
   a decorative layer including a first surface and a second surface opposite the first surface;
   a transparent first base made of a resin molded body and disposed on the first surface of the decorative layer; and
   a transparent second base made of a resin molded body and disposed on the second surface of the decorative layer, wherein
   an absolute value of a difference between a refractive index of a first resin material of the first base and a refractive index of a second resin material of the second base is less than or equal to 0.05,
   an absolute value of a difference between a heat deflection temperature of the first resin material and a heat deflection temperature of the second resin material is greater than or equal to 15 degrees,
   the first resin material is polycarbonate of bisphenol A having a single structure or a copolymerized polycarbonate of bisphenol A and imide monomer, and
   the second resin material is a copolymerized polycarbonate of bisphenol A and aliphatic monomer or a copolymerized polycarbonate of bisphenol A and ester monomer.

2. The infrared sensor cover according to claim 1, wherein the first surface of the decorative layer is an outer surface of the decorative layer,
   the second surface of the decorative layer is an inner surface of the decorative layer, and
   the heat deflection temperature of the first resin material is higher than the heat deflection temperature of the second resin material.

3. A method for manufacturing an infrared sensor cover according to claim 1, the method comprising:
   molding the first base using the first resin material having a higher heat deflection temperature than the second resin material;
   forming the decorative layer on an inner surface of the first base; and
   molding the second base on the inner surface of the decorative layer by inserting the first base on which the decorative layer is formed.

* * * * *